(12) United States Patent
Yang

(10) Patent No.: US 7,747,994 B1
(45) Date of Patent: Jun. 29, 2010

(54) GENERATOR BASED ON MULTIPLE INSTRUCTION STREAMS AND MINIMUM SIZE INSTRUCTION SET FOR GENERATING UPDATES TO MOBILE HANDSET

(75) Inventor: Xuguang Yang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 981 days.

(21) Appl. No.: 10/860,978

(22) Filed: Jun. 4, 2004

Related U.S. Application Data

(60) Provisional application No. 60/476,153, filed on Jun. 4, 2003.

(51) Int. Cl.
*G06F 9/44* (2006.01)

(52) U.S. Cl. .................. 717/168; 717/171; 717/173; 707/693; 708/203; 709/247; 341/51; 341/67

(58) Field of Classification Search ............... 707/101, 707/200, 203; 717/168
See application file for complete search history.

(56) References Cited

U.S. PATENT DOCUMENTS

| | | | | |
|---|---|---|---|---|
| 4,645,916 A | * | 2/1987 | Raisleger | 235/494 |
| 5,261,055 A | | 11/1993 | Moran et al. | 395/275 |
| 5,442,771 A | | 8/1995 | Filepp et al. | 395/650 |
| 5,479,637 A | | 12/1995 | Lisimaque et al. | 395/430 |
| 5,579,522 A | | 11/1996 | Christeson et al. | 395/652 |
| 5,596,738 A | | 1/1997 | Pope | 395/430 |
| 5,598,534 A | | 1/1997 | Haas | 395/200.09 |
| 5,608,910 A | | 3/1997 | Shimakura | 395/670 |
| 5,623,604 A | | 4/1997 | Russell et al. | 395/200.1 |
| 5,638,066 A | * | 6/1997 | Horiuchi et al. | 341/60 |
| 5,666,293 A | | 9/1997 | Metz et al. | 395/200.5 |
| 5,751,231 A | * | 5/1998 | Iverson | 341/59 |
| 5,752,039 A | | 5/1998 | Tanimura | 395/712 |
| 5,778,440 A | | 7/1998 | Yiu et al. | 711/154 |
| 5,790,974 A | | 8/1998 | Tognazzini | 701/204 |
| 5,878,256 A | | 3/1999 | Bealkowski et al. | 395/652 |
| 5,960,445 A | | 9/1999 | Tamori et al. | 707/203 |
| 6,009,497 A | | 12/1999 | Wells et al. | 711/103 |
| 6,018,747 A | * | 1/2000 | Burns et al. | 707/203 |
| 6,021,275 A | * | 2/2000 | Horwat | 717/159 |

(Continued)

FOREIGN PATENT DOCUMENTS

CA 2339923 3/2000

(Continued)

OTHER PUBLICATIONS

F. Yergeau, "UTF-8, a transformation format of ISO 10646", Jan. 1998, Alis Technologies, retrieved from: http://tools.ietf.org/html/rfc2279.*

(Continued)

*Primary Examiner*—Lewis A Bullock, Jr.
*Assistant Examiner*—Jue Wang

(57) ABSTRACT

A mobile handset network employs a generator to generate update packages and a corresponding update agent in mobile handset to update its firmware and/or software. The generator may employ multiple instruction streams and efficient encoding techniques to make the generated update packages efficient and compact. One of the multiple instruction streams may be used for variable length integers (VLI), which employs groups of a certain number of bits that can be extended as needed.

14 Claims, 2 Drawing Sheets

U.S. PATENT DOCUMENTS

| | | | |
|---|---|---|---|
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,425,125 B1 * | 7/2002 | Fries et al. | 717/168 |
| 6,438,585 B2 | 8/2002 | Mousseau et al. | 709/206 |
| 6,925,467 B2 * | 8/2005 | Gu et al. | 707/101 |
| 7,143,115 B2 * | 11/2006 | Jones et al. | 707/200 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0099726 A1 * | 7/2002 | Crudele et al. | 707/200 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2006/0106888 A1 * | 5/2006 | Iida et al. | 707/203 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

Claise et al., "IPFIX Protocol Specification", IPFIX Working Group, Jun. 2003, retrieved from: http://tools.ietf.org/html/draft-ietf-ipfix-protocol-00.*

"Focus on OpenView A guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the $1^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

GENERATOR BASED ON MULTIPLE INSTRUCTION STREAMS AND MINIMUM SIZE INSTRUCTION SET FOR GENERATING UPDATES TO MOBILE HANDSET

RELATED APPLICATIONS

This patent application makes reference to, claims priority to and claims benefit from U.S. Provisional Patent Application Ser. No. 60/476,153, entitled "Generator Based on Multiple Instruction Streams and Minimum Size Instruction Set for Generating Updates to Mobile Handset," filed on Jun. 4, 2003.

The complete subject matter of the above-referenced U.S. Provisional Patent Application is hereby incorporated herein by reference, in its entirety. In addition, this application makes reference to U.S. Provisional Patent Application Ser. No. 60/249,606, entitled "System and Method for Updating and Distributing Information", filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

The Applicant hereby identifies the following patent applications pursuant to 37 C.F.R. §1.78(f)(1):

U.S. patent application Ser. No. 10/887,490 filed Jul. 8, 2004;

U.S. patent application Ser. No. 10/902,452 filed on Jul. 29, 2004; and

PCT Application No. PCT/US04/24876 entering National Stage as EPO4779823.6 filed Jul. 29, 2004.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

Electronic devices often access servers to retrieve updating information that may be needed to update firmware and/or software. Sometimes thousands of mobile handsets simultaneously access the servers, and as a result some may not be able to connect. This creates a need for wireless networks to determine if individual mobile handsets can be updated, and a need to facilitate a download of updating information by mobile handsets.

Creating efficient and compact packages of updating information for firmware/software updates is a big challenge. Additionally, creating packages where difference information is expressed using a specialized and efficient instruction set, is also a challenge. Designing an update agent that can process these packages efficiently on the mobile handset may also be a challenge. Such solutions that can work in many wireless networks may be problematic to design.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a system that facilitates the updating of firmware in an electronic device, using updating information, received through a network. Such a system may comprise at least one electronic device comprising at least one of firmware and software, and a generator that generates updating information for the at least one of firmware and software. The generator may represents integer values using variably-sized groups of bits to enhance compression of the generated updating information, and the electronic device may be capable of employing the updating information that is generated by the generator. In an embodiment of the present invention, the variably-sized groups of bits may have a default size, and the default size may be extended dynamically during generation of the updating information.

In various embodiments in accordance with the present invention, the updating information may comprise operation codes associated with update instructions executable by an update agent in the at least one electronic device, and the variably sized group of bits may have a default illegal value that is otherwise never encountered. The update instructions may comprise only SET and COPY instructions, and the operation codes may be 1 bit in length. The SET instruction may comprise a 1-bit operation code, an integer length encoded in the variably-sized group of bits, and an amount of data represented by the integer length. The COPY instruction may comprise a 1-bit operation code, and an integer length and an offset both encoded in the variably-sized group of bits. The offset may be computed as a differential offset with reference to an offset of a previous instruction, and a third instruction may be selectively employed to implement an overwrite instruction. In addition, the default size may be extended when the value of a group of bits of the default size is the default illegal value, and the variably-sized groups of bits of the default size may have a plurality of default illegal values.

In an embodiment of the present invention, the default size may be extended when the value of a variable-sized group of bits of default size is one of the plurality of default illegal values, and a size of the extension may depend on the default illegal value of the plurality of default illegal values. The variably-sized groups of bits may be used to specify values associated with instructions used in generating the updating information. The network may be wireless, and the at least one electronic device may be portable.

Further aspects of the present invention may be found in a method that facilitates the updating of firmware in at least one electronic device, using updating information, through a network. Such a method may comprise generating updating information for at least one of firmware and software, representing integer values using variably-sized groups of bits to enhance compression of the generated updating information, and communicating the updating information to the electronic device over the network. The variably-sized groups of bits may have a default size, and the method may further comprise dynamically extending the default size during generation of the updating information. The variably-sized groups of bits of the default size may have a default illegal value, and the method may further comprise extending the default size when the value of a group of bits of the default size is the default illegal value.

In an embodiment of the present invention, the variably-sized groups of bits of the default size may have a plurality of default illegal values, and the method may further comprise extending the default size when the value of a group of bits of the default size is one of the plurality of default illegal values. The size of the extension may depend on the default illegal value of the plurality of default illegal values, and the method may further comprise using the variably-sized groups of bits to specify values associated with instructions used in generating the updating information.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to generating updates of firmware/software components in electronic devices such as, for example, mobile handsets using an update agent, and more specifically to the use of instruction sets in the generation of update packages that the update agents may process to produce updates for the firmware/software components. Although the following discusses aspects of the invention in terms of a mobile handset, it should be clear that the following also applies to other mobile electronic devices such as, for example, personal digital assistants (PDAs), pagers, personal computers (PCs), and similar hand-held electronic devices.

Figure 1:
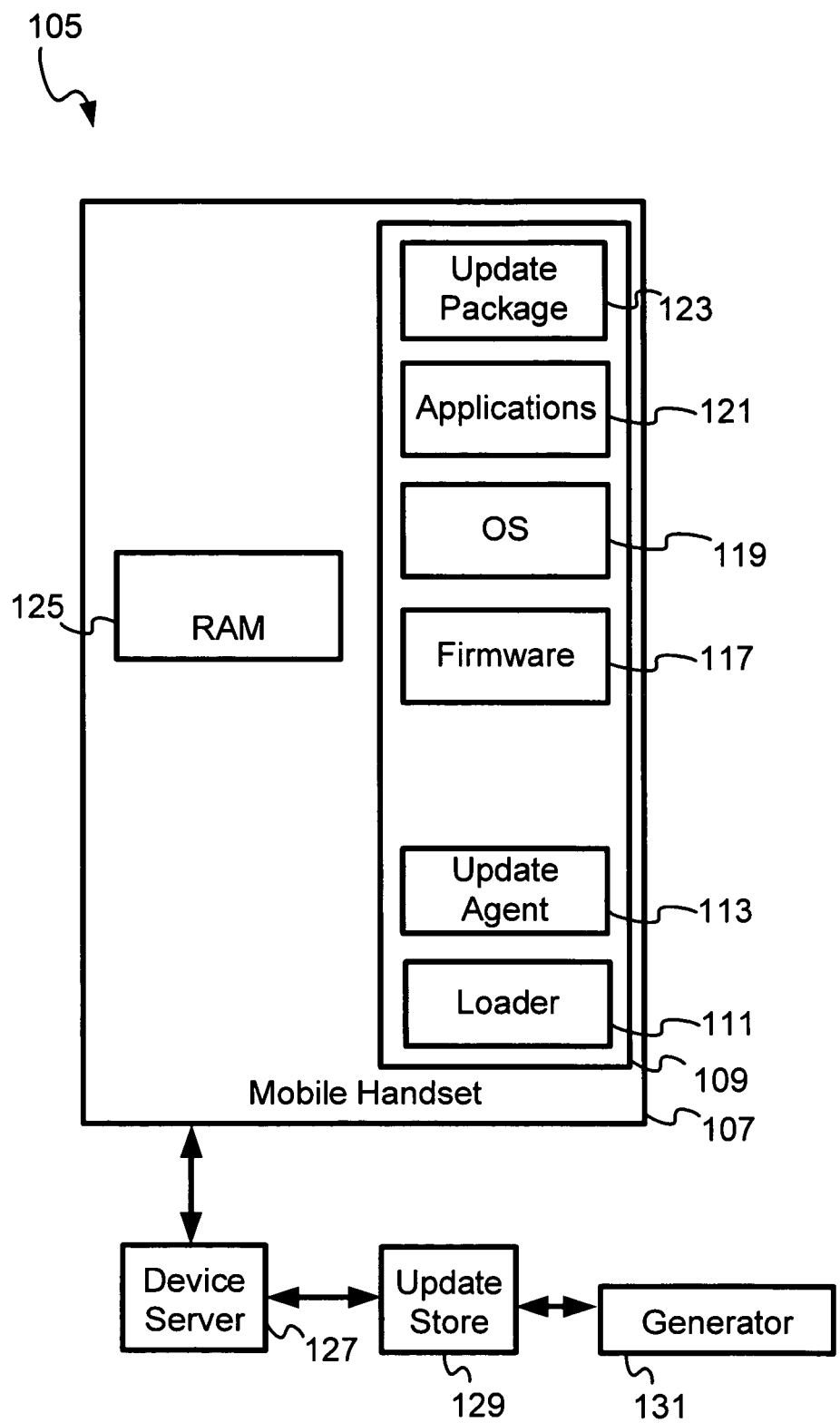
FIG. 1 illustrates a block diagram of an exemplary mobile handset network, in accordance with an embodiment of the present invention.

FIG. 1 illustrates a block diagram of an exemplary mobile handset network 105, in accordance with an embodiment of the present invention. The network 105 may comprise a mobile handset 107 communicatively coupled to a device server 127. The device server 127 may be communicatively coupled to an update store 129, which may be communicatively coupled to a generator 131.

In an embodiment of the present invention, the network 105 may dispense update packages generated by the generator 131 to the mobile handset 107. The mobile handset 107 may employ the dispensed update packages to update firmware and/or software. In an embodiment of the present invention, an update package may comprise executable instructions used to convert firmware/software in the mobile handset 107 from one version to another. In an embodiment of the present invention, the executable instructions may comprise the difference information between the new version and the old version of the firmware. Examples of such executable instructions may include SET, COPY, and OVERWRITE. The update packages generated by the generator 131 may be stored in an update store 129. The device server 127, which may be communicatively coupled to the mobile handset 107, may retrieve the update packages from the update store 129.

In an embodiment of the present invention, the mobile handset 107 may comprise a random access memory (RAM) unit 125 and a non-volatile memory 109. The non-volatile memory 109 may have a plurality of components such as, for example, a loader 111, an update agent 113, firmware 117, an operating system (OS) 119, applications 121, and an update package 123.

In an embodiment of the present invention, the generator 131 may employ a technique for processing content to create update packages. The content may be, for example, an older version of firmware/software and a newer version of the same firmware/software. The created update packages may be employed by the mobile handset 107 to update the associated firmware/software in the mobile handset 107.

In an embodiment of the present invention, multiple instruction streams (MIS) may be employed in the generator 131 to enable improved compression of the generated update packages when using compression techniques such as, for example, zlib. In an embodiment of the present invention, three instruction streams may be employed. For example, one instruction stream may be used for op-codes, another for a variable length integer (VLI), and a third for SET data. SET data may be data values used in the second version of firmware that may have not been available to be copied or converted from the first version of firmware during the production of the second version. The stream used for VLI may contain lengths and offsets, which may be represented by a special VLI encoding scheme. The lengths may represent the number of byte needed for copied or SET data. Offsets may be the distance of the start of the location to be copied from a reference point. For example, if a pointer to the destination is pointing to address 0x2000, and in the instruction:

COPY 10, 0x0100 the length is 10 bytes and the offset is 0x0100, the above instruction may indicate that starting at location 0x2100 in the source, the next 10 bytes should be copied to the target (destination) starting at location 0x2000. Following execution of the instruction the pointer to the destination may be pointing at location 0x2010.

In an embodiment of the present invention, the mobile handset 107 may comprise several update agents 113. An update package may be generated by the generator 131 employing multiple instruction streams, and portions of the streams may be processed by different update agents 113. For example, one update agent may process the stream containing the op-codes, whereas the stream containing the VLI may be processed by another update agent.

In an embodiment of the present invention, the op-codes may be encoded employing, for example, one bit per instruction, with two instructions being employed—a COPY and a SET instruction. For example, a 1 may be used to represent the instruction SET and 0 may be used to represent the instruction COPY. In an embodiment of the present invention, every SET may be followed by a COPY instruction. In such an embodiment, the transmission of the first "0" after each "1" may be avoided, as it may be implied. For example, the instruction sequence 100101000010100 may instead be encoded as 101100110, with the five implied '0's removed during encoding. To decode the encoded instruction sequence, it may only be necessary to insert a 0 after each 1 in order to recreate the original instruction sequence.

In an embodiment of the present invention, an OVERWRITE instruction may be employed in addition to the COPY and a SET instructions. The OVERWRITE instruction may replace the use of SET instructions in some situations to make the update package more compact and efficient. The OVERWRITE instruction may have a length field specifying the number of bytes to be overwritten, and a data field indicating the difference between the data values of the target and the source, where the difference may be added to the specified number of bytes.

In an embodiment of the present invention, due to the locality of data dependency, i.e. a locality of reference, offset values of successive COPY instructions may be found to be very close. The offsets computed for data or symbols in the code being processed may be computed as a difference between offsets of any COPY instruction and the previous COPY instruction, and as a result may enable the encoding of offsets as a short number rather than as a long number. In an embodiment of the present invention, 'differential offsets' may be used, where after the specification of an initial offset, all subsequent offsets may be computed/encoded as a difference between the value of the actual offset and that of an offset in a previous COPY instruction. The offset may be generated as a difference between its actual value in an instruction and that of an offset in any previous instruction encountered, i.e. an offset of a previous instruction of any type. The following example illustrates encoding using differences between offsets:

```
...
COPY      length1, offset1
(SET...)
COPY      length2, offset2'
...
```

Where offset2 may be encoded as the difference between offset2 and offset1 or:

offset2'=offset2−offset1

In an embodiment of the present invention, a VLI may be used to encode integer numbers being employed to specify the length values such as, for example, length of data, length of code, etc., as unsigned integers, and to specify absolute or differential offsets as signed integers. In an embodiment of the present invention, the VLI may employ n bits that may be extended, if necessary, using an escape sequence or a control bit employed to indicate the extension.

In an embodiment of the present invention, the VLI technique may employ groups of n bits. The n bits may be extended as needed, and the n bits may be dynamically specified. In an embodiment of the present invention, the value of n may be hard-coded such that the mobile handset/update agent may know the value of n. For example, n may be set to 7, and 1 bit may be employed as a control bit such as, for example, to enable extensions. Data having a value of up to 128 such as, for example, offsets or length values, may be specified without using an extension. For example, an address differential for an offset of up to 127 may be specified, while an escape sequence (or escape bits) or control bits may be employed to specify offset values above 127. For encoding a length, the use of 7 bits may permit an indication of a length of up to 128, or 128 bytes. In an embodiment of the present invention, depending on the type of data, either an escape sequence or a control bit may be employed to specify extensions.

In an embodiment of the present invention, a VLI may be employed to specify the lengths associated with COPY instructions. COPY lengths may be limited to a minimum size, for example, SEGMENT size. To make encoding efficient, known values of illegal length values may be used as an escape sequence. In an embodiment of the present invention, if an extension of a length field is needed, based on escape sequence, it may be possible to include an "illegal" length, which may be less than the segment size, in the first byte or first group of data to signal that. Thus, the use of a control bit may not be necessary, and the use of an escape sequence to specify extensions may suffice. If, for example, the COPY length is frequently less than the maximum length value that can be specified in one byte (or one group of n bits), then the use of even a one bit control bit field may be inefficient, because the use of the control bit may limit the maximum un-extended value to 127 or 128, a value that may be frequently exceeded. In an embodiment of the present invention, the use of an escape sequence may be preferable.

The following is an example of an encoding that may be possible using a VLI for a length specification of a COPY instruction with segment size=3, and n=8.

Length<256, one byte is sufficient. This may be the default, or most frequent case.

$2^8 <=$Length$<2^{16}$. Three bytes are used. The first byte is set to 0 to indicate an extension of 2n bit units, and the following 2 bytes contain the length data.

$2^{16} <=$Length$<2^{24}$. Four bytes are used. The first byte is set to 1 to indicate an extension of 3n bit units.

$2^{24} <=$Length$<2^{32}$. Five bytes are used. The first byte is set to 2 to indicate an extension of 4n bit units.

In an embodiment of the present invention, a VLI may be employed to specify the lengths associated with the SET instructions, wherein the length may be any positive number. Because the setting of a field of zero bytes in length is of no utility, the SET length may only be positive. Therefore, the value 0 may be used as an escape sequence for the SET length value, that is, first group being 0. If an extension of length needs to be implemented, the first extension may be performed by the escape sequence of 0 and control bits may specify successive extensions.

Length<256, one byte is sufficient. This may be the default case.

$2^8 <=$Length$<2^{15}$. Three bytes are used. The first byte is set to 0 to indicate an extension of 2 bytes. Control bits in the first of the two extension bytes may indicate the length of the extension beyond two bytes (0), in this example indicating an extension of only two bytes.

$2^{15} <=$Length$<2^{22}$. Four bytes are used. The first byte is set to 0, as above. The control bits in the first extension byte may indicate the length of the extension beyond two bytes (2), to indicate in this case an extension of three bytes.

In an embodiment of the present invention, the instruction stream that deals with offsets may not be employed (i.e., present or used in the update package) and no escape sequence may be available for offsets. Thus, extensions of integer values may have to use control bits. In such a case, a sign bit may not be employed if the offset value is 0. A sign bit may be employed when the value of an offset is not equal to 0.

In an embodiment of the present invention, the VLI group sizes, n, may be different for each type of data. A VLI may be used, for example, in a generator such as generator 131 of FIG. 1 for the following integer field values: SET length, COPY length, and offset. In an embodiment of the present invention, the VLI group sizes, n, may be different for each type of data, depending upon the distribution of the data values. Therefore, different streams in a multiple stream encoding may employ different values of n for VLI grouping.

In an embodiment of the present invention, a SET instruction may behave as an OVERWRITE instruction, as shown in the sample instruction sequence below:

COPY 100, 0x20000
SET 2, (SET data)
COPY 30, 0x2000

In the above example, the SET instruction may actually be an OVERWRITE instruction, characterized by the previous and next COPY offsets being the same. In this example, the offsets are relative addresses and not absolute values. In an embodiment of the present invention, OVERWRITE patterns may be repetitive.

In an embodiment of the present invention, an OVERWRITE instruction may be used instead of a SET instruction. In an embodiment of the present invention, the generator 131 may employ two kinds of SET instruction: Normal (encoded, for example, as 10), and Overwrite (encoded, for example, as 11). Thus, if the op-code is 11, the next COPY may not encode an offset, and may use an overwrite cache, to hold new data or old data. If the overwrite pattern of the op-code, i.e. 11 is found in the cache, then the cache index may be used for the item in the cache, otherwise, new data and update cache may be used.

Figure 2:
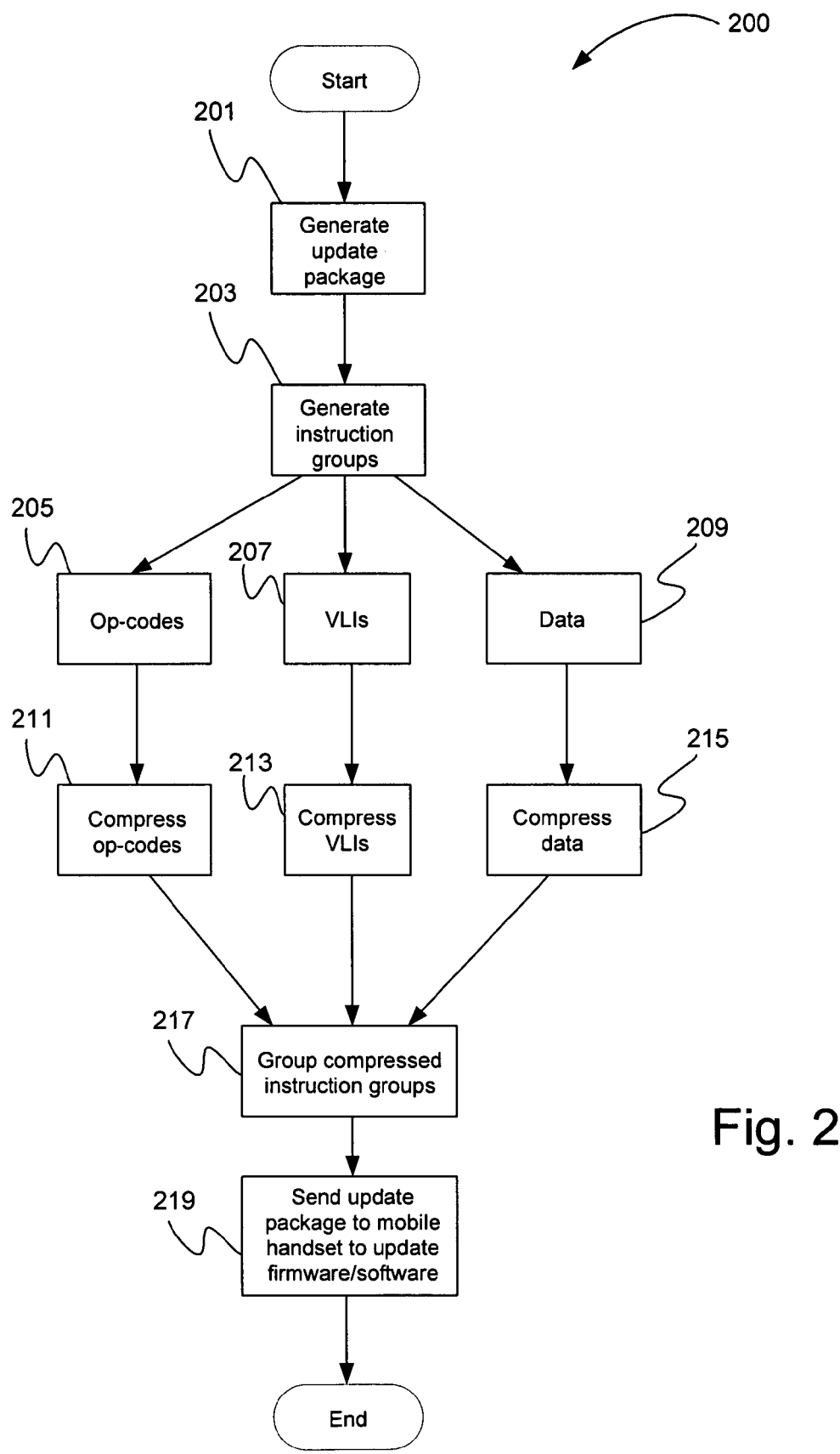
FIG. 2 illustrates a flow diagram of an exemplary update process in a mobile handset, in accordance with an embodiment of the present invention.

FIG. 2 illustrates a flow diagram of an exemplary update process 200 in a mobile handset, in accordance with an embodiment of the present invention. The process may start at 201 where the update package may be generated. The update package may comprise executable instructions needed to convert firmware/software from one version to another. The executable instructions may then be grouped into different groups at 203. The instruction groups may comprise a group for op-codes 205, a group for VLIs 207, and a group for data 209. Each group may then get compressed further using appropriate standard compression techniques at 211, 213, and 215, respectively. The compressed instruction groups may then get set together as an update package at 217, and sent to the mobile handset 107 for updating firmware/software at 219.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system that facilitates the updating of firmware in an electronic device, using updating information, received through a network, the system comprising:
   at least one electronic device comprising at least one of firmware and software;
   a generator that generates updating information for the at least one of firmware and software, wherein the generator represents integer values using a variably-sized group of bits to enhance compression of the generated updating information, wherein the variably-sized group of bits has a default size having a plurality of default illegal represented integer values that are otherwise never encountered, and wherein the default size is extended when the value of the variably-sized group of bits of the default size is one of the default illegal represented integer values; and
   wherein the electronic device is capable of employing the updating information that is generated by the generator, and wherein
   a size of the extension depends on the default illegal represented integer value of the plurality of default illegal represented integer values.

2. The system according to claim 1 wherein the default size is extended dynamically during generation of the updating information.

3. The system according to claim 1 wherein the updating information comprises operation codes associated with update instructions executable by an update agent in the at least one electronic device.

4. The system according to claim 3 wherein the update instructions comprise only SET and COPY instructions, and wherein the operation codes are 1 bit in length.

5. The system according to claim 4 wherein the SET instruction comprises a 1-bit operation code, an integer length encoded in the variably-sized group of bits, and an amount of data represented by the integer length.

6. The system according to claim 4 wherein the COPY instruction comprises a 1-bit operation code, and an integer length and an offset both encoded in the variably-sized group of bits.

7. The system according to claim 6 wherein the offset is computed as a differential offset with reference to an offset of a previous instruction.

8. The system according to claim 4 wherein a third instruction is selectively employed to implement an overwrite instruction.

9. The system according to claim 1 wherein the variably-sized group of bits is used to specify values associated with instructions used in generating the updating information.

10. The system according to claim 1 wherein the network is wireless.

11. The system according to claim 1 wherein the electronic device is portable.

12. A method that facilitates the updating of firmware in at least one electronic device, using updating information, through a network, the method comprising:
   generating updating information for at least one of firmware and software;
   representing integer values using a variably-sized group of bits to enhance compression of the generated updating information, wherein the variably-sized group of bits has a default size having a plurality of default illegal represented integer values that are otherwise never encountered, and wherein the default size is extended when the value of the variably-sized group of bits of the default size is one of the default illegal represented integer values; and
   communicating the updating information to the electronic device over the network, wherein
   a size of the extension depends on the default illegal represented integer value of the plurality of default illegal represented integer values.

13. The method according to claim 12 further comprising dynamically extending the default size during generation of the updating information.

14. The method according to claim 12 further comprising using the variably-sized group of bits to specify values associated with instructions used in generating the updating information.

* * * * *